United States Patent [19]

Maru

[11] Patent Number: 4,977,611
[45] Date of Patent: Dec. 11, 1990

[54] PORTABLE RADIO APPARATUS HAVING BATTERY SAVED CHANNEL SCANNING FUNCTION

[75] Inventor: Tsuguo Maru, Tokyo, Japan

[73] Assignee: NEC Corporation, Japan

[21] Appl. No.: 158,210

[22] Filed: Feb. 19, 1988

[30] Foreign Application Priority Data

Feb. 20, 1987 [JP] Japan .................... 62-37008

[51] Int. Cl.⁵ .......................... H04B 1/04; H04B 1/16
[52] U.S. Cl. .................................. 455/161; 455/127; 455/166; 455/343
[58] Field of Search ........................ 455/78, 89, 79, 90, 455/83, 76, 123, 343, 36, 127, 161, 166, 185, 186, 89, 90; 340/825.44

[56] References Cited

U.S. PATENT DOCUMENTS

| 3,962,553 | 6/1976 | Linder et al. | 455/89 |
| 4,181,893 | 1/1980 | Ehmke | 455/343 |
| 4,384,361 | 5/1983 | Masaki | 455/343 |
| 4,419,765 | 12/1983 | Wycoff et al. | 455/36 |
| 4,457,018 | 6/1984 | Takayama | 455/79 |
| 4,631,496 | 12/1986 | Borras et al. | 455/76 |
| 4,794,649 | 12/1988 | Fujiwara | 455/343 |

FOREIGN PATENT DOCUMENTS

61-98030 5/1986 Japan .

Primary Examiner—Reinhard J. Eisenzopf
Assistant Examiner—Curtis Kuntz
Attorney, Agent, or Firm—Laff, Whitesel, Conte & Saret

[57] ABSTRACT

A portable radio apparatus may operate in a battery saving mode on any one of a plurality of channels, in order to communicate with a central office. The apparatus selects a channel for its use on a basis of the strength of the electrical fields on the various channels. During an initial period the apparatus scans continuously for a channel. If no channel is found during the initial period, the apparatus switches to an intermittent scan, with power down between the intermittent scan, thus providing the battery saving mode.

16 Claims, 5 Drawing Sheets

PORTABLE RADIO APPARATUS HAVING BATTERY SAVED CHANNEL SCANNING FUNCTION

BACKGROUND OF THE INVENTION

The present invention relates to a portable radio apparatus for a vehicle telephone system or the like and, more particularly, to a portable radio apparatus having a channel scanning function.

A vehicle telephone system, for example, has control channels and audio channels, and a mobile subscriber receiver is tuned to any of the control channels which is in a waiting condition. While an electric field is not developed on the control channel to which the receiver is tuned, the receiver repeatedly performs channel scanning until it finds a control channel with an electric field. A receiver with an implementation for saving power while data reception is under way with an electric field developed is disclosed in Japanese Laid-Open Patent Publication (Kokai) No. 98030/1986, or Patent Application No. 219231/1979, which is assigned to the assignee of this invention and which was laid open on May 16, 1986.

Specifically, the above-mentioned receiver is constructed so that a serially received data stream is converted into parallel data by a serial-to-parallel converter only when parallel outputs of the converter are received, a microprocessor is operated intermittently. Such an intermittent operation of the microprocessor is successful in reducing the power which is consumed by the entire receiver. This prior art receiver, however, suffers from a drawback because battery saving is not guaranteed while received data is absent under a no-field condition, although battery savings are achievable during data reception. More specifically, in a no-field condition, the receiver performs channels scanning continuously in order to acquire a channel on which an electric field is developed thus, causing a receiving section thereof to continuously consume power.

SUMMARY OF THE INVENTION

It is, therefore, an object of the present invention to provide a portable radio apparatus which successfully implements a battery saving function during channel scanning.

It is another object of the present invention to provide a portable radio apparatus with a battery saving function which only rarely causes data reception to fail while the channel scanning is under way.

It is a further object of the present invention to provide a portable radio apparatus which allows a call to be originated at any desired time, even during battery saved channel scanning operation.

A portable radio apparatus of the present invention includes a receiving section which is selectively tuned to a plurality of channels. A switch circuit control the supply of power to the receiving section. A detecting circuit is responsive to the strength of electric fields which may be developed on the respective channels. A and a control section controls the channel scanning which is performed by the receiving section, as well as the opening and closing of the switch circuit. The control section controls the switch circuit so as to feed power to continuously the receiving section during channel scanning. When channel scanning has continued for more than a predetermined period of time, the control section starts on a battery saving scanning in which the channel scanning occurs intermittently. During such a saving scanning, power is fed to the receiving section on a basis which is timed to the saving scanning. The saving scanning successfully implements battery saving in the event of channel scanning.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

Figure 1:
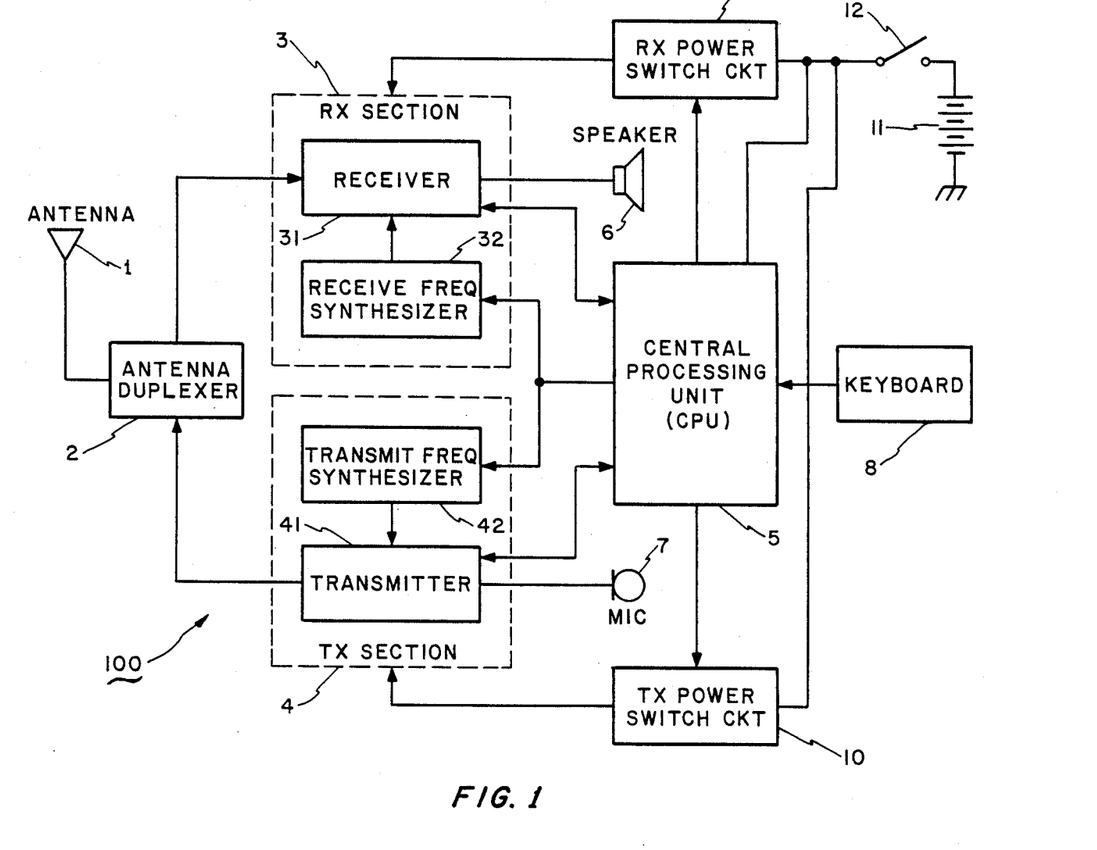
FIG. 1 is a schematic block diagram showing a portable radio apparatus embodying the present invention.

Referring to FIG. 1, a portable vehicle-mounted telephone to which the present invention is applied is shown and generally designated by reference numeral 100. The telephone 100 is representative of one subscriber telephone which is included in a vehicle telephone system which in turn, is connected to an ordinary public telephone network via a central station, not shown. Specifically, the telephone 100 is capable of communicating with ordinary subscriber telephones and with other vehicle-mounted telephones by way of the central station and public telephone network.

A signal picked up by an antenna 1, e.g., a frequency modulated (FM) signal is fed via an antenna duplexer 2 to a receiver 31 which is included in a receiving (RX) section 3. Demodulating the received FM signal, the receiver 31 delivers an audio signal to a speaker 6 and a control signal and other data to a central processing unit (CPU) 5. On the other hand, an audio signal entered through a microphone 7 and data from the CPU 5 are applied to a transmitter 41 which is built in a transmitting (TX) section 4. The transmitter 41 subjects this incoming signal to, for example, frequency modulation and, then, applies the resulting signal to the antenna 1 via the antenna duplexer 2. This signal is sent from the antenna 1 to the central station.

The CPU 5 controls the entire telephone 100. To tune the receiver 31 and transmitter 41 to a given channel, the CPU 5 delivers a channel designating signal to receive and transmit frequency synthesizers 32 and 42, respectively. In response, the synthesizers 32 and 42 apply signals to, respectively, the receiver 31 and transmitter 41. Each of these signals has an oscillation frequency which is associated with the channel designating signal. The CPU 5 also receives a call originating signal, a dial signal and other signals from a keyboard 8. Further, the CPU 5 controls a RX power switch circuit 9 for controlling the supply of power from a battery 11 to the RX section 3. The CPU 5 also controls a TX power switch circuit 10 for controlling the supply of power from the battery 11 to the TX section 4. The CPU 5 is constantly powered so long as a power switch 12 is closed.

The TX power switch circuit 10 is controlled to interrupt the power supply while in a waiting condition and to establish the supply during the transmission of control data and during communication. In the case of a voice-operated transmitter (VOX), the circuit 10 may be controlled so that power is fed only when an audio signal is present during communication. The RX power switch circuit 9 is controlled to perform a battery saving operation during channel scanning.

The present invention is deeply concerned with control. More specifically, when a predetermined period of time such as 60 seconds expires before any data appears on any of the control channels during channel scanning, a battery saving mode is initiated in which power is intermittently supplied to the RX section 3. In the battery saving mode, power is supplied for a period of time which allows all of the control channels to be scanned by one cycle. Then, it is interrupted upon the lapse of a predetermined period of time, such as 9 seconds. This manner of channel scanning is referred to as "saving scanning" in this specification.

As soon as any data is detected on any of the control channels during a saving scanning, power is continuously applied to the RX section 3 to allow the latter to receive the data. On the other hand, when data which may follow is keyed in on the keyboard 8, the supply of power of the RX section 3 begins at that instant.

Figure 2:
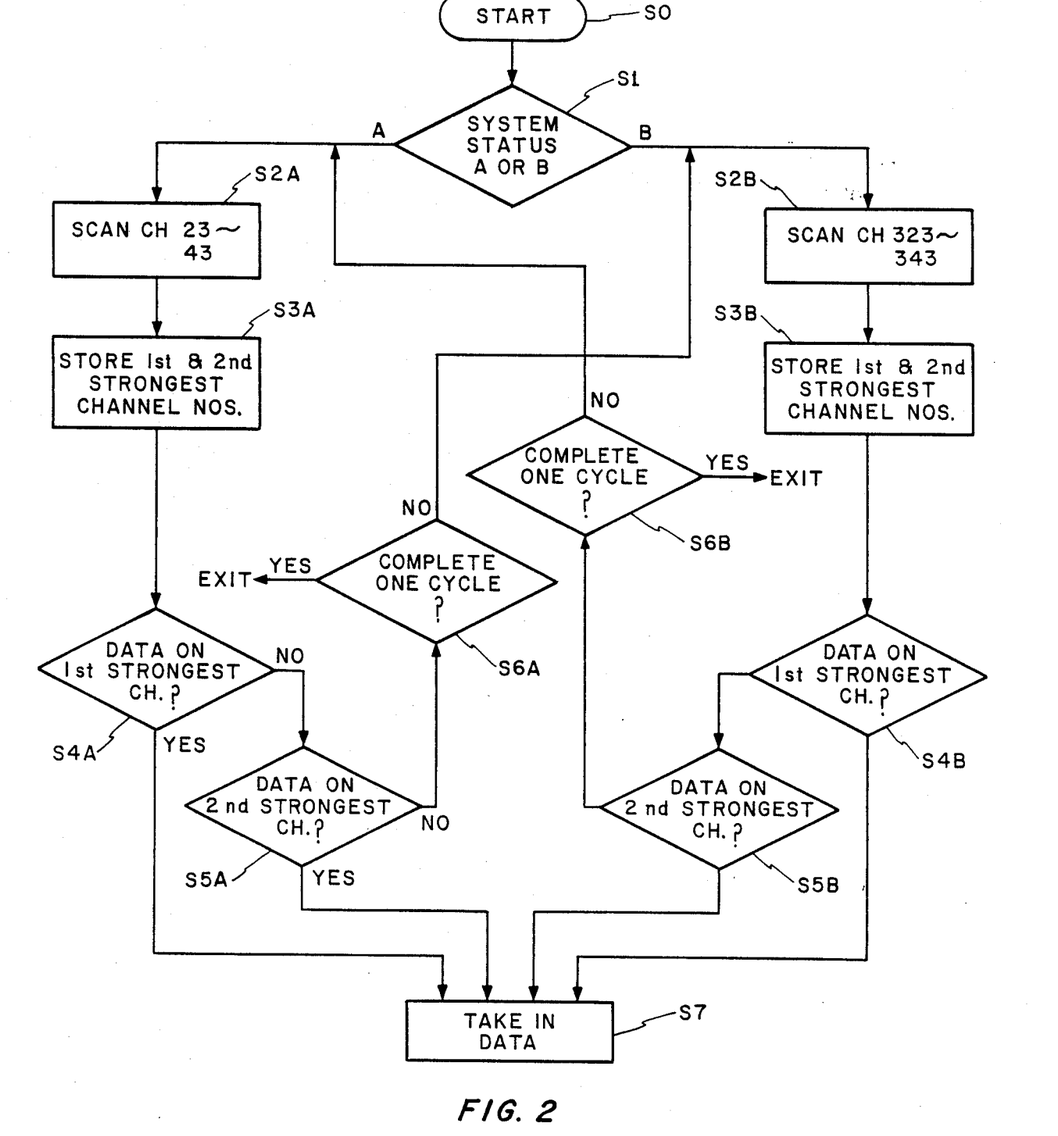
FIG. 2 is a flowchart demonstrating a channel scanning routine, as performed by the apparatus of FIG. 1.
Figure 3:
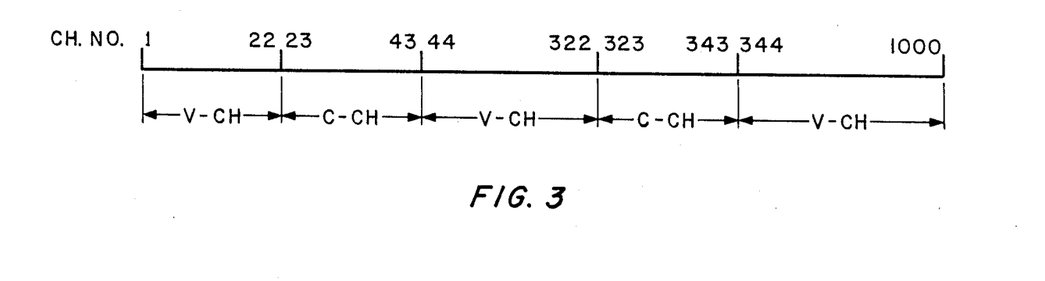
FIG. 3 is a chart schematically showing a channel arrangement which the apparatus of FIG. 1 uses.
Figure 4A:
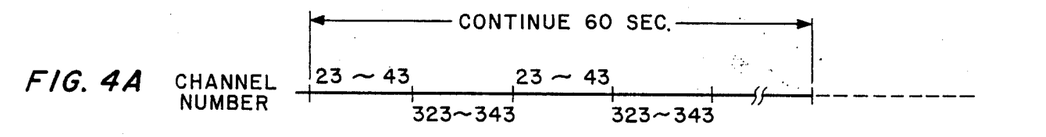
FIGS. 4A and 4B are timing charts showing a transition from the usual form of channel scanning to a battery saving channel scanning (hereinafter referred to as "saving scanning" for simplicity) which occurs in the apparatus of FIG. 1.
Figure 4B:
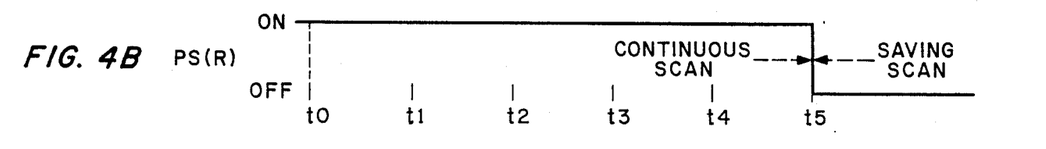

FIG. 2 shows a channel scanning routine of the apparatus. Upon the start of channel scanning (step S0), whether the system status is A or B is determined in step S1. The system status will be briefly described with reference to FIG. 3. This system has 1,000 channels in total, i.e., audio channels (V-CH) #1 to #22, #44 to #322, and #344 to #1,000 and control channels (C-CH) #23 to #43 and #323 to #343. In each receiver included in the system, either a status A or a status B is written as a system status in a read only memory (ID-ROM) which stores an identification (ID) number assigned to its own station. If it is the status A that is written in the ID-ROM, the receiver scans the control channels #23 to #43 first and, then, the control channels #323 to #343. If the status B is written in the ID-ROM, the receiver scans the control channels #323 to #343 and, then, the control channels #23 to #43. This is to prevent particular control channels from being overloaded because they are always selected first.

In FIG. 2, if the status is A as decided in step S1, the control channels #23 to #43 are scanned as stated above to store the numbers assigned to those channels which have the strongest and the second strongest field strength, respectively (steps S2A and S3A). Then, in step S4A, whether or not data is present on the channel having the strongest field strength is determined. If it is present, the program advances to step S7 for taking in that data. If data is not present on that channel, step S5A is executed to see if data is present on the channel having the second strongest field strength. If data is present on that channel, the program advances to step S7 to take in that data. If data is absent, the operation is transferred to step S2B by way of step S6A.

If the status is B as determined in step S1, the control channels #323 to #343 are sequentially scanned at step S2B so that those channels having the strongest and second strongest field strength are stored in step S3B. These steps S3B to S5B are exactly the same in operation as the previously mentioned steps S3A to S5A. If no data is found on the channel having the second strongest field strength as decided in step S5B, the program returns to step S2A through step S6B.

Each of the steps S6A and S6B is adapted to be sure that all of the forty two control channels have been scanned. If they have not been fully scanned, steps S6A and S6B are followed by, respectively, steps S2B and S2A to scan all of them. After all of the forty two control channels are scanned once the channel scanning routine is terminated. However, even after the termination of the channel scanning routine, the program returns to the start (step S0) while channel scanning is executed in the ordinary mode which is distinguished from the saving scan mode, as described in detail later.

A reference will be made to FIGS. 4A, 4B, 5A, 5B, 6A, 6B, 7A and 7B for explaining the saving scanning which is the characteristic operation in accordance with the present invention. When the apparatus is powered at a time t0 or when a certain control channel changes from a data present state to a data absent, or to a no-data state at the time t0, the channel scanning operation previously described with reference to FIG. 2 is initiated. Since the system status of the radio apparatus is assumed to be A, the apparatus scans the control channels #23 to #43 from the time t0 to a time t1 and, then, the control channels #323 to #343 from the time t1 to a time t2. This scanning procedure is repeated thereafter. The period of time, that is necessary for scanning one channel is about 40 milliseconds. There fore, about 1.7 seconds are needed to complete one round of the scan of the forty-two control channels. When no data is not found on any of the channels upon the lapse of a predetermined period of time, e.g., 60 seconds after the channel scanning has been started at the time t0, the saving scanning is initiated. The supply of power to the RX section 3, FIG. 1, is interrupted at a time t5 and continuing onward.

Figure 5A:
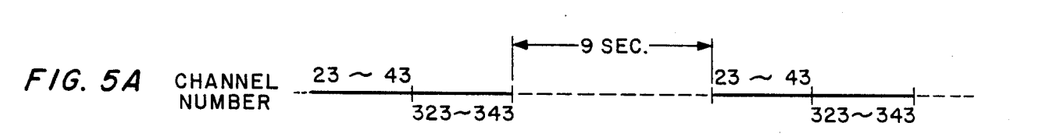
FIGS. 5A and 5B are timing charts representative of a condition in which the apparatus of FIG. 1 is performing the saving scanning.
Figure 5B:
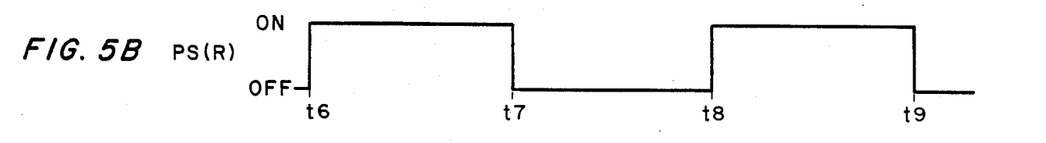

What occurs during the saving scanning is shown in FIGS. 5A and 5B. As shown, at a time t6, the power supply to the RX section 3 begins while, at the same time, channel scanning begins. When no data is found on any of the control channels #23 to #43 and #323 to #343 by during one checking cycle, the power supply is interrupted at a time t7 so as to start a battery saving mode of operation. In the saving mode, the power supply and the channel scanning are each interrupted for a predetermined period of time such as 9 seconds. Then, at a time t8, the saving mode is replaced with the channel scanning mode again. During the interval between times t8 and t9, the same operation that is performed during the interval between the times t6 and t7 is repeated.

Figure 6A:
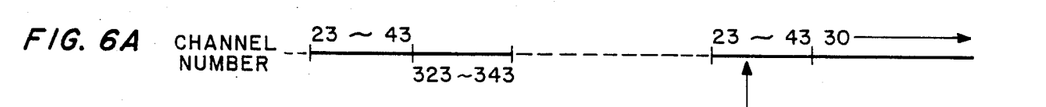
FIGS. 6A and 6B are timing charts showing a condition in which data is received while the apparatus of FIG. 1 is performing the saving scanning.
Figure 6B:
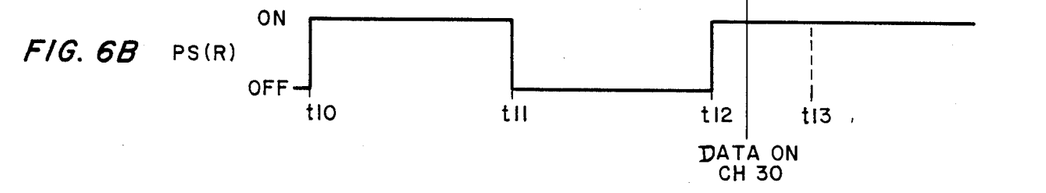

FIGS. 6A and 6B are representative of an exemplary condition wherein data is found on the control channel #30 for example during the saving scanning. In FIG. 6B, the saving scanning operation shown in FIGS. 5A to 5B is performed from a time t10 to a time t12. When data is detected on the control channel #30 while the control channels #23 to #43 are sequentially scanned during the interval between times t12 and t13, the saving scanning is interrupted at the time t13 while, at the same time, the channel #30 is seized to start taking in the data.

Figure 7A:
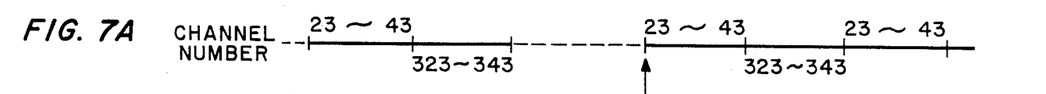
FIGS. 7A and 7B are timing charts showing a condition in which data is keyed in while the apparatus of FIG. 1 is effecting the saving scanning.
Figure 7B:
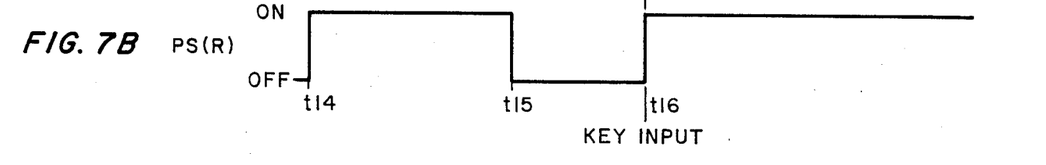

FIGS. 7A and 7B show another exemplary condition in which data is keyed in while the saving scanning is under way. During the interval between times t14 and t15, channel scanning is performed. Assuming that a key input occurs at a time t16 while the power supply is interrupted, the saving scanning is immediately stopped and replaced with an ordinary continuous scanning mode. The words "key input" mentioned above applies to any of the keys which are provided on the keyboard 8, FIG. 1, and which may be operated as desired. This is because, whatever the operated key may be, it is apparent that the subscriber intends to take some action, such as origination of a call. Further, a key input is validated at any time during the saving scanning so that the usual channel scanning is resumed.

Figure 8:
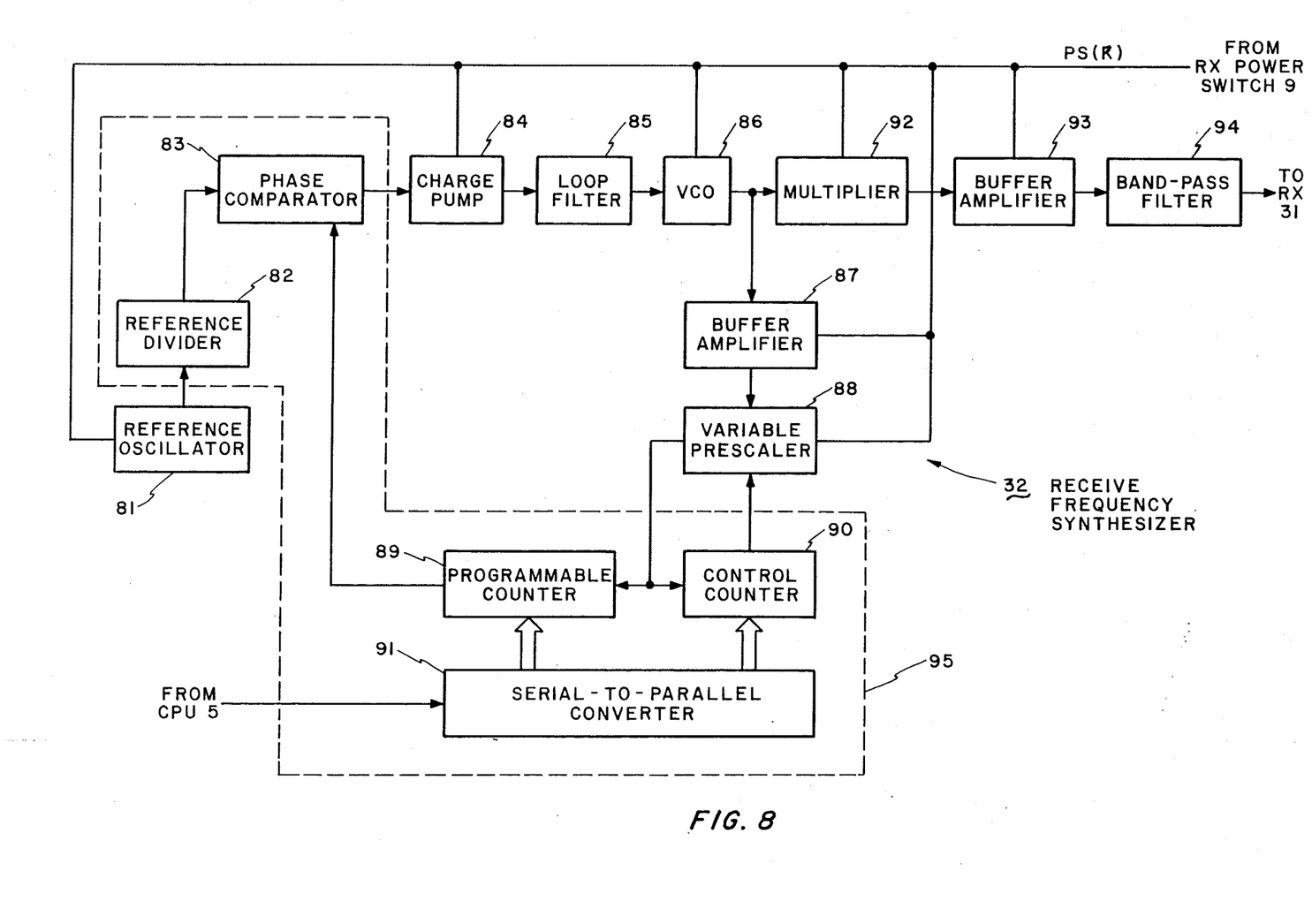
FIG. 8 is a schematic block diagram showing a specific construction of a receive frequency synthesizer which is included in the apparatus of FIG. 1.

FIG. 8 shows a specific construction of the receive frequency synthesizer 32 and a reference oscillator 81. The reference oscillator 81 generates a reference oscillation signal while a reference divider 82 divides the reference oscillation signal by a predetermined number. The output of the reference divider 82 is fed to one input terminal of a phase comparator 83. The other input terminal of comparator 83 receives an output of a programmable counter 89. Comparing the phase of the two input signals, the phase comparator 83 produces a phase error signal and delivers it to a charge pump 84. In response, the charge pump 84 drives a loop filter 85 by supplying it with a current which is associated with the phase error signal. The low-pass output of the filter 85 is fed to a voltage controlled oscillator (VCO) 86, as an oscillation control signal. The output of VCO 86 is coupled, through a buffer amplifier 87, to a variable prescaler 88 which is adapted for making a predetermined division. The output of the prescaler 88 is further divided by the programmable counter 89 and, then, routed to the phase comparator 83. The division ratio of the prescaler 88 has two different stages which are selectively set up by a control counter 90.

A channel designating signal is fed from the CPU 5, FIG. 1, to a serial-to-parallel converter 91 to be converted into parallel signals. The parallel signals are applied to the counters 89 and 90. Each of the counters 89 and 90, therefore, is loaded with a particular division ratio which is associated with the channel designating signal.

Since the elements 81 to 91 constitute, in combination, a programmable phase locked loop (PLL), a signal whose frequency is associated with the channel designating signal which is applied to the serial-to-parallel converter 91 appears on the output of VCO 86. The output of VCO 86 is also applied to a frequency multiplier 92. The output of multiplier 92 is routed to the receiver 31, FIG. 1, by way of a buffer amplifier 93 and a band-pass filter 94.

The supply of power to the reference oscillator 81, charge pump 84, VCO 86, buffer amplifier 87, prescaler 88, multiplier 92 and buffer amplifier 93 is controlled by the RX power switch circuit 9, FIG. 1. It is to be noted that a block demarcated by a dashed line in FIG. 8 and designated by the reference numeral 95 is implemented with a one-chip complementary metal oxide semiconductor (CMOS).

Figure 9:
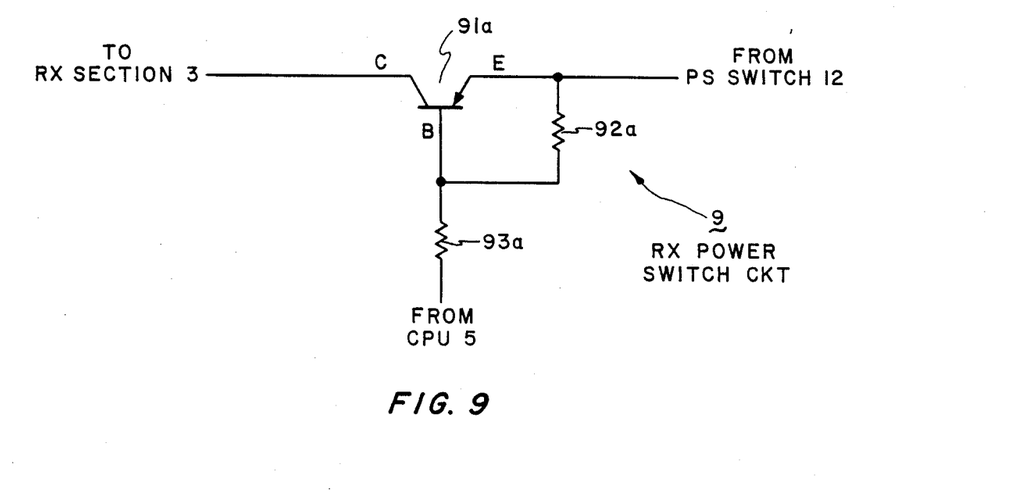
FIG. 9 is a diagram showing a power switch circuit also included in the apparatus of FIG. 1.

Referring to FIG. 9, a specific construction of the RX power switch circuit 9 is shown. As shown, a PNP transistor 91 has an emitter E and a collector C which are connected to the power switch 12 and the RX section 3, respectively. The base B of transistor 91 is connected to the CPU 5 via a resistor 93 and to the emitter E via a resistor 92. When the CPU 5 delivers a low level signal, the transistor 91 is rendered conductive with a result that power is fed to the RX section 3. Conversely, when the CPU 5 delivers a high level signal, the transistor 91 is turned off to interrupt the supply of power to the RX section 3.

Figure 10:
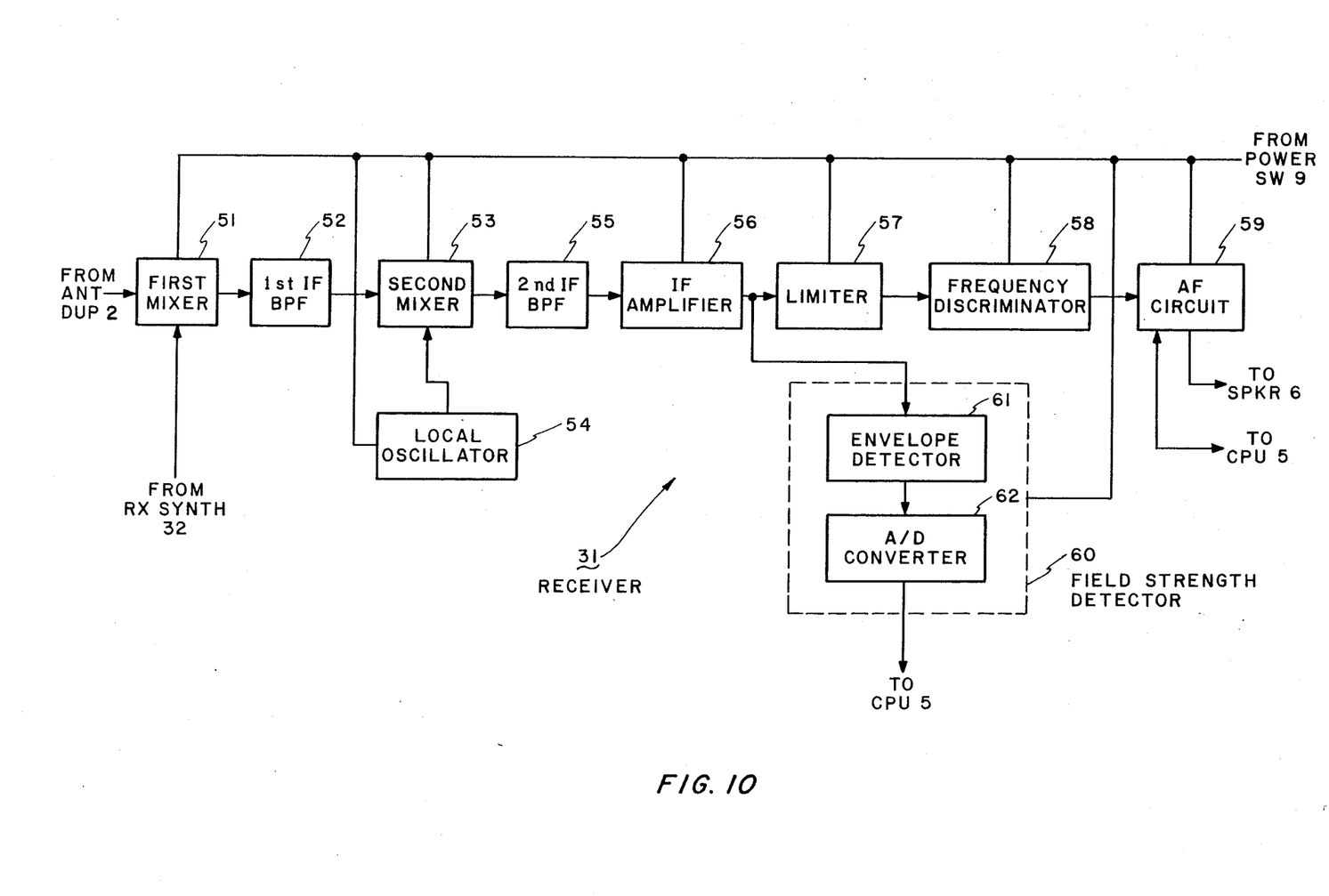
FIG. 10 is a schematic block diagram of a receiver which is shown in FIG. 1 and includes a field strength detector.

FIG. 10 is a block diagram showing the receiver 31 which includes a field strength detector 60. The receiver is a double superheterodyne type which, per se, is well known in the art therefore, it will be briefly described hereinafter. A received signal coming in through the antenna duplexer 2 is applied to a first mixer 51 to be mixed down into a first intermediate frequency (IF) signal. A local oscillation signal is fed to the mixer 51, from the receive frequency synthesizer 32, FIG. 1. The first IF signal is propagated through a first IF band-pass filter 52 to a second mixer 53 which then mixes the input IF signal with a local oscillation signal fed from a local oscillator 54, so as to mix it down into a second IF signal. This second IF signal is passed through a second IF band-pass filter 55, amplified by an IF amplifier 56, and then limited in amplitude by a limiter 57.

The output of limiter 57 is routed to a frequency discriminator 58 on one hand and to the field strength detector 60 on the other hand. The frequency discriminator 58 demodulates the second IF signal to produce an audio frequency (AF) signal which is applied to an AF circuit 59. The AF circuit 59 includes an AF amplifier, a low pass filter (LPF) and other circuits, and delivers its output to the speaker 6 and CPU 5.

The field strength detector 60 includes an envelope detector 61 which is adapted to detect the envelope of the outputs of the limiter 51. An analog-to-digital (A/D) converter 62 converts the levels of the detected envelope and feeds the resulting digital signal to the CPU 5.

The supply of power to the first and second mixers 51 and 53, local oscillator 54, IF amplifier 56, limiter 57, frequency discriminator 58, AF circuit 59, and field strength detector 60 is controlled by the RX power switch circuit 9.

In summary, it will be seen that the present invention provides a vehicle-mounted telephone which is usable over a long time period with a minimum of current consumption. This is because channel scanning is effected intermittently to search for a channel with an electric field. Even when the telephone is left in poor electric field environments, the power consumption is thus suppressed. Another advantage which is attainable with the present invention is that, since the intermittent channel scanning operation is interrupted for a predetermined period of time after the reception of data, there is no delay in response due to the intermittent operation even in those environments which suffer from sharp changes in electric field.

Further, the delay in response to an operator due to the intermittent operation is eliminated because, after any data has been keyed in, the intermittent operation is not performed until a predetermined period of time expires.

What is claimed is:

1. A portable radio apparatus comprising a receiving section capable of being tuned to any of a plurality of channels, a switch circuit for controlling a supply of battery power to said receiving section, and a control section connected to said receiving section and said switch circuit, said control section including:
   channel scanning means for performing a channel scanning in which said receiving section is sequentially tuned through said plurality of channels;
   first detecting means coupled to said channel scanning means for detecting an electric field strength on each of said plurality of channels;
   second detecting means coupled to said channel scanning means and to said first detecting means for detecting predetermined data in a channel among said plurality of channels, said channel having the strongest electric field strength;
   means responsive to a lack of predetermined data appearing on said channel detected by said second detecting means for changing over said channel scanning means to an intermittent scanning operation after a first predetermined time period, said intermittent scanning operation repeating cycle combined by one round scanning of said plurality of channels and interruption of a second predetermined time period, and
   means coupled to said switch circuit for switching off said battery power to said receiving section during said second predetermined time period, where said channel scanning is cyclically and continuously performed during said first predetermined time period.

2. A portable radio apparatus as claimed in claim 1, wherein said control section is further operated responsive to the receipt of said predetermined data on any of said channels while said intermittent scanning operation is under way, said control section tuning said receiving section to seize said particular channel while controlling said switch circuit to continuously feed power to said receiving section.

3. A portable radio apparatus as claimed in claim 1, further comprising a keyboard connected to said control section for regenerating a key signal responsive to an operation to said keyboard, said control section operating responsive to said key signal during said intermittent scanning operation for controlling said switch circuit to stop said intermittent scanning operation while continuously feeding power to said receiving section.

4. A portable radio apparatus as claimed in claim 1, wherein one round of said channel scanning includes at least the steps of: scanning all of said channels, storing an identification of a first and a second channel having, respectively, the strongest and the second strongest electric field into storing means; determining whether or not said predetermined data is present on either of said first and second channels; and taking in said predetermined data if it is present on any of said first and second channels.

5. A portable radio apparatus as claimed in claim 2, wherein said plurality of channels include a first and a second channel group associated with a first and a second communication system, respectively, one round of said channel scanning including the steps of: when said apparatus is set to a first status, scanning said first channel group; storing information of a first channel of said first channel group having the strongest electric field in that first channel group into storing means; determining whether or not data is present on said first channel; taking in any data present on said first channel; scanning said second channel group if no data is present on said first channel; storing information of a second channel of said second channel group having the strongest electric field in that second channel group into storing means; determining whether or not data is present on said second channel; taking in any data present on said second channel; and terminating said one round of said channel scanning if no data is present on said second channel.

6. A portable radio apparatus as claimed in 1, wherein said first detecting means comprises an envelope detector for detecting an envelope of a signal which is outputted by an intermediate frequency (IF) stage of said receiving section, and an analog-to-digital (A/D) converter for converting the output of said envelope detector to a digital signal.

7. A portable radio apparatus as claimed in claim 1, wherein said switch circuit comprises a PNP transistor having an emitter and a collector which are connected to, respective, said battery and said receiving section, a base of said transistor being connected to said control section.

8. A portable radio apparatus as claimed in claim 1, wherein said receiving section comprises:
   frequency converting means for converting a received signal into an intermediate frequency (IF) signal in response to a local oscillation signal;
   demodulating means responsive to said frequently converting means for demodulating said IF signal into an audio frequency (AF) signal;
   means in said control section for sending a channel designation signal;
   frequency synthesizer means responsive to said channel designating signal from said control section for changing an output frequency and for delivering an output to said frequency converting means as said local oscillation signal; and
   said first detecting means circuit comprising detector means for detecting an envelope of said IF signal, and an A/D converter means for converting the output of said detector means into a digital signal.

9. A portable radio apparatus having an intermittent scanning function, comprising:
   a radio seciton capable of being tuned to any of a pluraltiy of channels;
   a power switch for establishing and interrupting a supply of power to said radio section;
   control means effective while said apparatus is in a waiting condition for controlling said radio section to sequentially scan control channels to measure reception levels corresponding to electric field strength on said respective control channels, said control means tuning said radio section to one of said control channels which has the highest reception level and, if that one channel does not respond, to another of said control channels which has the second highest reception level, said control means repeating said channel scanning when no data is received, and means for controlling said power switch to interrupt a supply of power to corresponding portions of said apparatus, except for at least a timer section when data is not received for a predetermined period of time;

means for resuming said channel scanning by feeding power to said portions, which have been disconnected from said radio section, at predetermined time intervals after the interruption of the power supply; and means for interrupting said intermittent scanning and executing said channel scanning when a predetermined condition is reached.

10. A portable radio apparatus as claimed in claim 9, wherein said predetermined condition is the reception of data or the entry of a key input on an operating section of said radio apparatus.

11. A method of scanning channels of a portable radio apparatus, comprising the steps of:

tuning a receiving section to a plurality of channels to detect the electric field strength of the respective channels;

selecting at least one channel among said plurality of channels having the strongest electric field strength;

deciding whether or not data is present on said at least one channel;

when data is not present on said at least one channel, cyclically and continuously tuning said receiving section to the respective channels;

when said cyclic and continuous tuning operation has continued for more than a predetermined period of time while data is not present on any of said channels, intermittently tuning said receiving section to said respective channels; and feeding power to said receiving section continuously during said continuous tuning operation and intermittently during said intermittent tuning operation.

12. A method as claimed in claim 11, further comprising the steps of:

when data is present on any of said channels during said intermittent tuning operation, fixedly tuning said receiving section to said particular channel; and when said receiving section is tuned to said particular channel, continuously feeding power to said receiving section.

13. A method as claimed in claim 1, further comprising the steps of:

manually generating a key signal; and when said key signal is produced during said intermittent tuning operation, resuming said continuous tuning operation and discontinuing said intermittent tuning operation.

14. A portable radio apparatus which may seize and operate on one of a plurality of channels, said apparatus comprising:

a switchable power supply means for selectively supplying or not supplying power to said apparatus;

first detector means for detecting the strength of electric fields on said channels;

channel scanning means for scanning said channels to sequentially tune said apparatus to one of said channels on a basis of the strength of electric fields detected by said first detector means;

second detector means for detecting data on one of said channels to which said apparatus is tuned;

control means for controlling said switchable power supply to continuously supply said power to said apparatus during an initial scanning period; and battery saving means responsive to lack of data detection by said second detector means during said initial scanning period for controlling said switchable power supply to intermittently supply said power to said apparatus during intermittent scanning periods.

15. The apparatus of claim 14 which further includes central processing means for controlling said control means for operating said switchable power supply means, said central processing means being programmed to:

cause a first group of said radio apparatus to first scan a first group of said channels and thereafter to scan a second group of said channels, if said first scan is not successful, and to cause a second group of said radio apparatus to first scan said second group of channels and thereafter to scan said first group of channels if said first can is not successful, and;

cause said battery saving means to switch from said continuous to said intermittent scanning.

16. A portable radio apparatus having a receiving section and a switch for controlling a supply of battery power to said receiving section, said radio apparatus comprising:

means for sequentially tuning a plurality of channels to detect the strength of any electric field on the respective channels;

means for storing the strength of the electric field of the respective channels detected by said tuning means;

means responsive to the strength of the electric field as stored in said storing means for selecting at least one channel having the strongest strength of electric field;

means coupled to said selecting means for judging whether or not predetermined data are contained in the selected channel;

means responsive to no predetermined data appearing on said selected channel for changing over said tuning means to an intermittent operation after a first predetermined time period, said intermittent operation repeating a cycle combined by one round of tuning operations of said plurality of channels and interruption of a second predetermined time period, and means coupled to said switch for switching off said battery power to said receiving section during said second predetermined time period, wherein the tuning operation of said tuning means is cyclically and continuously performed within said first predetermined time period.

* * * * *